INVENTOR.
ARTHUR F. SMITH
BY Frank E. Robbins

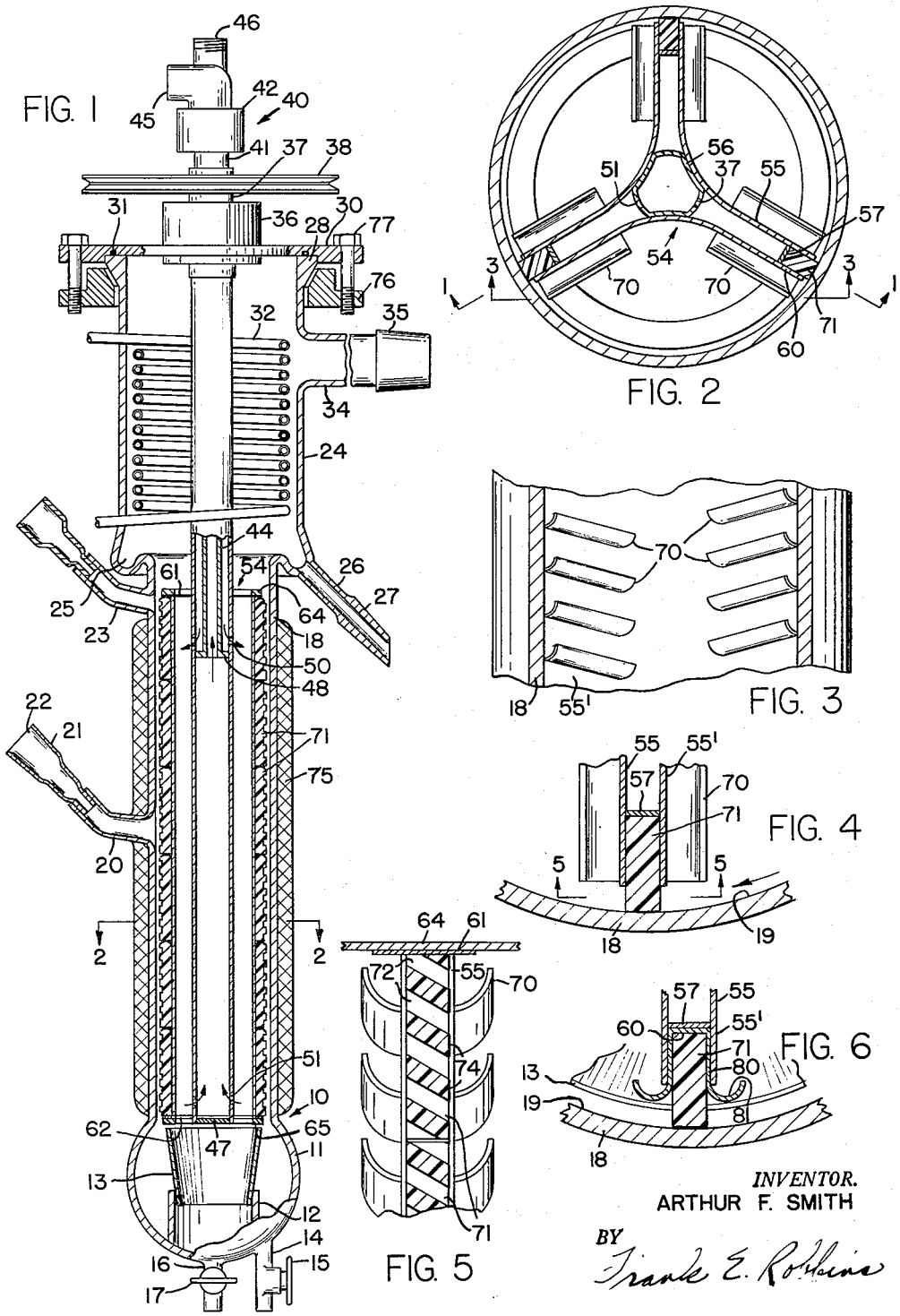

United States Patent Office 2,993,842
Patented July 25, 1961

2,993,842
FRACTIONATING PROCESSES AND APPARATUS
FOR CARRYING OUT THE SAME
Arthur F. Smith, 1516 Lake Road, Webster, N.Y.
Filed May 7, 1959, Ser. No. 811,692
16 Claims. (Cl. 202—64)

This invention relates to an improved apparatus and process for fractional distillation, particularly for fractional distillation under reduced pressures. The invention described herein is an improvement of the invention described in my copending application, Serial No. 776,789, filed November 28, 1958.

Efficient fractionation is difficult to obtain under high vacuum, because it is difficult to maintain the high vacuum and, at the same time, to obtain effective countercurrent contact between the distillate in vapor form and the liquid distilland. Previous attempts to obtain fractionation in high vacuum distillation have involved repeated vaporization, condensation, revaporization and recondensation, in a single distillation column, to carry down heavier components as undistilled residue, and to permit the lighter fractions to go off in vapor form for condensation as recoverable product.

One form of apparatus for high vacuum fractional distillation is the so-called brush still, in which a rotary brush condenser is employed to agitate a falling liquid film and to redistribute condensate to that film. The brush still is an excellent apparatus for fractionating at high vacuum. However, there is considerable holdup in such a still, and throughput is accordingly low. Mechanically, the rate of wear of the brush is high. Thermal efficiency is relatively low. Moreover, it is exceedingly difficult, and impractical, to use a brush still for simple molecular distillation.

One field of use for a fractionating still, for which the brush still in many cases is unsuited, is in the propagation of chemical reactions.

Many important organic chemical products are produced by reversible chemical reactions, and are recovered from equilibrium mixtures that contain the desired products and, usually, one or more unreacted or incompletely reacted raw materials. One common approach to conducting reversible reactions that produce equilibrium mixtures is to use a large excess of one reactant, in the hope that the other reactant(s) will be used as completely as possible. In conducting an acid-alcohol esterification, for example, the alcohol is frequently employed as the excess reactant, and the evolved water is removed. When a satisfactory equilibrium is attained, the excess alcohol usually is stripped off. However, no matter how large the excess of alcohol, there is inevitably some residual free acid. This residual acid usually is removed by an alkali wash.

Alkali washing adds a great deal to the expense of esterification. To conduct the alkali washing properly, the equilibrium mixture must be cooled to a temperature below the hydrolysis temperature of the ester. After the alkali wash, reheating and distillation are necessary, to obtain the desired ester. Despite the involved process steps and the costs involved, many commercially available esters leave much to be desired as to color properties, odor, purity and cost.

A fractionator that could remove the acid economically would find widespread use. The brush still could be used very effectively in some cases. For commercial production, however, its throughput is too low in many cases; and in other cases, such as in the production of polyesters, the product may be too viscous to be processed.

One object of the present invention is to provide practical distillation apparatus, that can be used efficiently for simple molecular distillation and, as well, for fractional distillation at high vacuum.

A related object of the invention is to provide a multipurpose still that can be used as a simple molecular still, or as a high vacuum fractional still, by making simple mechanical adjustments that can be made while the still is in operation.

Another object of the invention is to provide a fixture that can be inserted with ease in a fractional distillation apparatus, to convert the apparatus to molecular distillation apparatus.

A related object of the invention is to provide fractional distillation apparatus of the falling film type, in which the liquid film is accelerated downwardly over the evaporating surface, to minimize the thermal hazard, and in which the condensate is, at least partially, collected and returned to the evaporating surface above the level at which condensation occurred, to maximize residence time, on the evaporating surface, of the returned condensate.

Another object of the invention is to provide a practical fractionating still for high vacuum distillation, that provides a large number of theoretical plates in a minimum volume, and with a minimum thermal hazard.

A further object of the invention is to provide an efficient process for fractionating liquids, that is particularly useful for fractionating viscous liquids of low thermal conductivity, and, as well, liquids containing fractions that are subject to decomposition or destruction in other ways upon substantial exposure to high temperatures or to the atmosphere.

Another object of the present invention is to provide a practical process for the effective propagation of chemical reactions that, under standard conditions of temperature and pressure, form an equilibrium mixture from which at least one product of reaction must be removed in order to drive the reaction to substantial completion.

A more specific object of the invention is to provide an improved and practical process for producing organic reaction products, of reversible chemical reactions that produce equilibrium mixtures that contain at least one reaction product that must be removed in order to drive the reactions substantially to completion, and that have superior characteristics of purity, color, and odor.

Another specific object of the invention is to provide a practical, improved process for producing esters that have superior characteristics of purity, color, and odor.

Another specific object of the invention is to provide a process for producing, without the necessity of a neutralization step, an acid-free reaction product of a reversible chemical reaction involving an acid as a raw material, which reaction produces an equilibrium mixture that contains at least one reaction product that must be removed in order to drive the reaction to substantial completion, and which mixture usually contains residual acid as a contaminant.

Another object of the invention is to provide a practical high vacuum fractionating still that can handle viscous throughput effectively.

Other objects of the invention will be apparent hereinafter from the specification and from the recital of the appended claims.

In the drawing:

FIG. 1 is a section of a fractionating still, the fractionating portion of the still being shown as a section taken on line 1—1 of FIG. 2, looking in the direction of the arrows, the remainder being an axial section, the still being particularly adapted for use at reduced pressures, and constructed according to one embodiment of this invention;

FIG. 2 is a section taken on the line 2—2 of FIG. 1, looking in the direction of the arrows, on an enlarged scale;

FIG. 3 is a section taken on the line 3—3 of FIG. 2, looking in the direction of the arrows, on the same enlarged scale;

FIG. 4 is a fragmentary section on a more enlarged scale, taken substantially on the line 2—2 of FIG. 1, looking in the direction of the arrows, and showing only a single wiper as it engages the evaporating surface of the still wall;

FIG. 5 is an elevation thereof, with the wall removed, better to show the construction of the wiper blade;

FIG. 6 is a fragmentary section, generally similar to the section shown in FIG. 4, of a modified embodiment of the invention.

Figure 7:
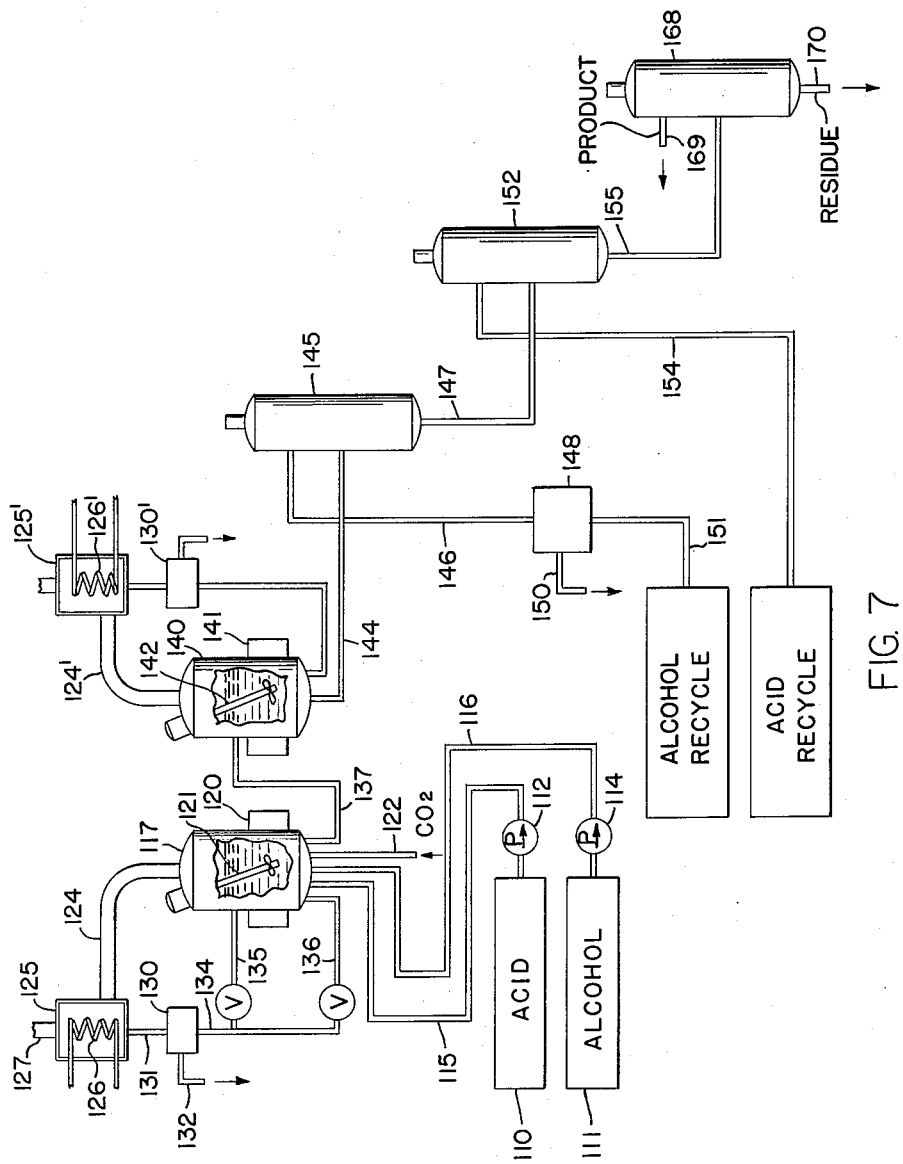
FIG. 7 is a schematic diagram of a plant layout for conducting an esterification according to one embodiment of the process of this invention.

Referring now in detail to the drawing by numerals of reference, 10 denotes a casing that is adapted to be supported in an upright position and that has a bottom bulb portion 11 of generally spherical shape. A generally cylindrical wall 12 is secured to the bottom of the bulb 11 to project upwardly therefrom, to provide a dam that separates the bulb into a pair of concentric reservoirs. A funnel 13 is seated on the upper end of the wall 12. A nipple 14 and valve 15 are secured to the bulb 11, outside the wall 12, to permit drainage of the outer reservoir. A nipple 16 and valve 17 are secured to the bulb 11 to communicate with the space within the wall 12, to permit drainage of the inner reservoir.

The casing 10 has a tubular portion 18 that is integral with the bulb 11 and whose axis is aligned with the center of the bulb 11 and with the axis of the cylindrical wall 12. The inner surface 19 of the tubular portion 18 is substantially cylindrical, to function as the evaporating surface of the still. An inlet tube or arm 20 is secured to the tubular portion 18 approximately midway between its ends. The tube 20 is generally upwardly directed, and has a funnel member 21 that is secured, in vacuum-tight fashion, to its upper end. The lower end of the funnel member 21 is reduced and projects into the tube 20 and radially spaced relation to the wall of the tube. The funnel member 21 preferably is formed at its upper end with an internal ground surface 22, in which a ground male stopper or joint portion can be inserted in vacuum-tight fashion.

A similar inlet assembly 23 is integrally secured to the upper end of the tubular portion 18.

The tubular portion 18 is enlarged at its upper end, and is flared outwardly and downwardly, then up again, to provide a head 24 that is of enlarged diameter relative to the tubular portion 18, and that drains into a gutter or alembic 25. A generally downwardly directed tube 26 is integrally connected with the head 24 to communicate with the gutter 25. The curved portion of the glass wall forming the gutter 25 is sloped to provide natural drainage, and the tube 26 is disposed to communicate with the gutter 25 at the lowest part of the gutter, to permit liquid that accumulates in the gutter to be drained. The tube 26 is formed at its outer end with a ground male surface 27, for vacuum-tight connection to a receiver (not shown).

The head 24 is formed at its upper end with an outwardly thickened wall portion 28 that has a flat upper surface on which a cap 30 is disposed. The cap 30 is formed with a ring-shaped channel in its lower face, confronting the flat surface of the rim 28, and an O-ring 31 is seated in the channel and is compressed between the cap 30 and the surface of the rim 28, to provide a vacuum-tight seal.

A coil 32 is mounted in the head 24, with its inlet and outlet lines passed through the wall of the head in vacuum-tight fashion. The convolutions of the coil 32 are disposed closely adjacent the inner surface of the wall of the head 24, to permit condensate that forms on the coil convolutions to drain into the gutter 25.

A relatively large diameter nipple 34 is integrally secured to the wall of the head 24, adjacent its upper end, to communicate with the interior of the head. The nipple 34 is formed at its outer end with a ground male surface 35, for vacuum-tight connection to a vacuum pumping system.

A bearing 36 is centrally mounted in the cap 30, and a hollow shaft 37 is rotatably journaled in the bearing 36, in vacuum-tight fashion. The shaft 37 projects into the casing 10 substantially coaxially with the head 24 and the tubular portion 18 of the casing. To provide means for rotation of the shaft 37, a pulley wheel 38 is secured to the portion of the shaft 37 that projects upwardly through the bearing 36.

For a purpose that will presently become evident, a rotary coupling 40 is connected to the upper end of the shaft 37. The coupling 40 is of a standard make, such as, for example, the type described in U.S. Patent 2,407,-745; and it includes a nipple 41 that is threaded, in vacuum-tight fashion, into the upper end of the shaft 37, for rotation upon rotation of the shaft. The nipple 41 is rotatably journaled in a housing 42. A tube 44 depends downwardly from the housing 42, coaxially with the bore of the shaft 37, and terminates adjacent the upper end of the tubular portion 18 of the still casing. The housing 42 is connected to a fitting that projects upwardly therefrom and that is formed with a fluid inlet 45 and with a fluid outlet 46. The bore of the tube 44 communicates with the fluid outlet 46 within the housing 42, in fluid-tight fashion.

The tube 44 projects concentrically within the shaft 37 to provide an annular space therebetween. A ring 48 is secured in fluid-tight fashion about the lower end of the tube 44, and to the inner wall of the shaft 37, to close this annular space in fluid-tight fashion.

A plug 47 is mounted across the lower end of the shaft 37, to close the bore of the shaft 37 at its lower end. The shaft 37 is formed with a set of openings 50 immediately above the ring 48, and with a second set of openings 51, immediately above the plug 47, for purposes to be described presently.

A partial or fractionating condenser, denoted generally by the numeral 54, is mounted on the shaft 37, within the tubular portion 18 of the casing 10, to rotate upon rotation of the shaft. The axial length of the condenser 54 corresponds roughly to the axial extent of the tubular portion 18 of the casing, and the upper end of the condenser terminates at a level just below the alembic 25.

The condenser 54 is formed from plates that are secured to the shaft 37. Three plates 55 (FIG. 2), that are curved in horizontal section, are secured in axially extending concave indentations 56 in the shaft 37, in equiangularly spaced relation about the shaft. The center portion of each of the plates 55 is engaged in one of the axially-extending indentations or grooves 56 respectively, as shown in FIG. 2, and is secured therein by spot welding, bolts, or other convenient means (not shown).

In making the assembly of the plates 55 to the shaft 37, preferably the plates 55 are first curved to the desired shape, then are pressed with the shaft 37 on a mandrel to be sure that the indentations 56 that are formed in the shaft, and the curved center portions of the plates 55, conform to each other. The two free ends of each of the plates 55 extend outwardly in a generally radial direction, in substantially uniformly spaced relation to the adjacent free ends of the adjacent plates, to terminate in close proximity to the evaporating surface 19. Three axially extending plates 57 are secured between the confronting surfaces of the free ends of the adjacent plates 55, at equally radially inwardly spaced distances from their free ends, to form three generally U-shaped, axially extending channels 60.

End pieces 61, 62 are secured to the shaft 37 and between confronting portions of adjacent plates 55, respectively, at the upper and lower ends of the condenser respectively, to close the spaces between the plates at each end. The end pieces 61, 62 are preferably formed to conform to the shape of the condenser and are not solid discs. The end pieces 61, 62, and the three strips 57 are secured to the plates 55 in vacuum-tight fashion, to form three closed chambers within the condenser, extending respectively from the shaft 37 radially outwardly to each of the three strips 57. The apertures 50, 51 respectively in the shaft 37 are disposed to communicate with the three closed chambers respectively, as best shown in FIG. 2.

A pair of rings 64, 65 respectively are secured to the upper and lower ends of the condenser plate 55 respectively, over the end pieces 61, 62, to rigidify the condenser structure. The lower ring 65 also provides a stop at the lower end of the three channels 60.

The axially extending surfaces 55' of the plates 55 are the condensing surfaces. A plurality of open-ended troughs 70 are secured on these condensing surfaces 55'. The troughs 70 are arranged, as best shown in FIG. 3, in vertically aligned columns, there being one column on each generally radially extending condensing surface 55'. The troughs 70 within each column are disposed generally in parallelism with each other and are inclined upwardly from the shaft 37 out toward the radially outer edge of the condensing surface 55'. The troughs are open at both their ends. Preferably, as shown in FIG. 4, the troughs extend radially outwardly to terminate closely adjacent the inner surface of the tubular portion 18 of the still.

A plurality of wiper elements 71 are mounted one above the other in each of the three channels 60. These wiper elements 71 are curved at their upper ends, as shown in FIG. 1, and have straight lower ends, so that they can slide freely one on the other in straight line, substantially frictionless contact, for independent outward radial movement under centrifugal force as the shaft 37 and the condenser 54 are rotated. Each wiper element 71 is formed with a plurality of slots 72 that are milled or molded in its radially outer face, to provide a plurality of lands or projecting portions 74, that engage the evaporating surface 19 upon rotation of the condenser 54. The slots 72 are formed with parallel walls that are inclined to the horizontal, so that, upon clockwise rotation of the condenser 54 relative to FIG. 2, the slots are inclined downwardly from the leading edges of the wipers 70 to their trailing edges.

To heat the casing 10 during operation of the apparatus for distillation, an electrical heating jacket 75 of standard type is secured around the casing 10.

While the casing 10 can be supported in substantially any convenient, desired manner, to hold it in upright position during operation of the device, I prefer to support it by a modified pipe coupling 76, that engages about the upper end of the head 24, around the outwardly flared upper portion 28 of the head. The coupling 76 can, in turn, be supported from a stand, or in any other convenient manner. The coupling 72 is secured to the cap 30 by bolts 77.

To use the apparatus for continuous fractional distillation at high vacuum, the inlet assembly 23 is sealed, a distillate receiver is connected to the gutter drain tube 26, and the tube 20 and funnel 21 are connected in vacuum-tight fashion to a source of degassed liquid that is to be processed, and that can supply liquid to the tube 20 in a regulated, continuous stream. The nipple 34 is then connected to a pumping system and the still is evacuated. The amount of liquid that is fed to the still is adjusted to a desired flow rate. Heat is applied to the casing 10 by the heating jacket 75. The pulley 38 is connected to a drive to rotate the pulley 38, the shaft 37, and the condenser 54 in a clockwise direction.

The feed liquid that is passed through the tube 20 runs onto the evaporating surface 19 of the casing 18, and begins to flow downwardly thereover in a film under the influence of gravity. As the condenser 54 is rotated, the wipers 71 are thrown radially outwardly under centrifugal force. The lands 74 of the wipers 71 engage the evaporating surface 19, and remove the liquid film from the surface with a wiping action. The removed liquid passes into the slots 72 and is accelerated downwardly within the slots 72 by the rotary movement of the wipers. The removed liquid is discharged from the slots 72 and returns to the evaporating surface 19, at a downwardly displaced location from the portion of the surface 19 from which it was removed. The returned liquid again forms a film, and flows downwardly over the evaporating surface 19 under the influence of gravity.

A cooling fluid, either gaseous or liquid, is circulated through the inlet 45 down through the annular space between the tube 44 and the shaft 37. The cooling fluid passes outwardly through the apertures 50 from this annular space into the three chambers between the condensing plates 55, and circulates within these chambers downwardly, until eventually the cooling fluid passes through the openings 51 to return to the bore of the shaft 37. Once admitted to the bore of the shaft 37, the cooling fluid passes upwardly and eventually passes through the bore of the tube 44 and out through the outlet 46. The circulating cooling fluid keeps the plates 55 at a cooled temperature.

As the liquid is heated on the evaporating surface 19, some of it vaporizes. The vapor leaves the liquid film on the evaporating surface and diffuses into the space between the evaporating surface and the condensing surfaces 55'. Part of the vapor is condensed on the cooled condensing surfaces 55'.

If the speed of rotation of the condenser 54 is relatively low, the liquid condensate will be acted upon, on the condensing surfaces 55', primarily by gravity and only secondarily by centrifugal force. The liquid condensate will tend to fall downwardly on the condensing surfaces 55', and, upon encountering one of the troughs 70, the condensate will tend to collect and to move radially inwardly and downwardly in the trough, until eventually it is discharged from the trough and forms a stream flowing downwardly over the condensing surface 55'. Preferably, as shown in FIG. 3, the troughs in one column are staggered relative to the troughs in the adjacent column, so that the streams of liquid from the two columns of troughs can merge easily. At the lower end of the condenser 54, the condensate stream will fall from the condensing surfaces 55' into the inner reservoir in the bulb 11, within the cylindrical wall 12.

Since at low speeds of rotation of the condenser, the condensate is not returned to the evaporating surface 19, but is recovered and collected as product, distillation under these conditions is molecular distillation if a high vacuum is maintained in the still. This type of distillation is quite satisfactory, for example, for separating vitamin A from fish oil, and for other separations where a minimum amount of fractionating power is required.

When the still is employed for molecular distillation, no distillate is returned to the evaporating surface 19. Consequently, the feed should be supplied to the still through the inlet assembly 23, or alternatively, if the tube 20 is employed, the heating jacket 75 should be capable of operation in upper and lower zones, above and below the inlet tube 20, respectively and only the lower heating zone need be used.

If the condenser 54 is caused to rotate at higher speeds, on the order of 200 r.p.m. and higher for stills that have a tubular portion 18 with a diameter on the order of 6", then, depending on the condenser temperature and on the viscosity of the condensate, centrifugal force will control the movement of the condensate on the condensing surfaces 55', rather than the force of gravity. Under these conditions, the liquid condensate tends to move radially outwardly on the condensing surfaces 55' and, also, to move downwardly. The liquid is caught, however, in the troughs 70, and under centrifugal force, is caused to move outwardly, so that it is returned to the evaporating surface 19, usually at a higher location than the location at which condensation occurred.

When the still is used for molecular distillation, ordinarily the primary recovery of the distillate will be from the reservoir within the cylindrical wall 12. However, a light fraction may be taken off by the condenser 32, to be recovered from the gutter 25. When the still is used for fractional distillation, ordinarily the product is condensed on the condenser 32 and recovered from the gutter 25. In both cases, the residue drops down from the evaporating surface 19 into the bulb 11, and is caught in the reservoir about the cylindrical wall 12.

With a given liquid that is to be separated into different components, and with a given still constructed according to this invention, the still can be operated in different ways simply by adjusting the speed of rotation of the condenser 54. Other effects can be obtained by modifying the angle at which the troughs 70 are inclined to the horizontal. Steeper troughs require higher rotational speeds in order to accomplish complete return of the condensate to the evaporating surface. Similarly, if the troughs are made shorter, so that they terminate in radially spaced relation to the evaporating surface 19, then the stream of condensate that is discharged from the radially outer end of the trough can be acted on by gravity before it is returned to the evaporating surface 19, and ordinarily will be returned to the evaporating surface 19 at a height that is somewhat below the height of the upper end of the trough.

The still can be used advantageously as a fractionating still for the recovery of vitamin A from fish oil. For this purpose, the fractionating still is capable of taking a very small cut, to recover a concentrate of higher concentration than is possible if only molecular distillation is employed. Vitamin A is a typical organic substance that is subject to decomposition upon prolonged thermal exposure. With a fractionating still that is constructed and operated according to this invention, however, and that is employed to distill vitamin A, unusually good results are obtained. The wipers reduce the throughput time in the still to a minimum. The liquid remains on the evaporating surface 19 for an extremely short time, and the liquid is pumped down over the evaporating surface by the action of the wipers. Furthermore, since the wipers keep the liquid in a film in an extremely turbulent state, the liquid is heated substantially uniformly, and localized overheating is avoided. There is therefore a minimum loss of vitamin A in the still because of thermal decomposition.

At the same time, excellent fractionation is obtained since the condensate ordinarily is returned to the evaporating surface 19 at a higher elevation than the elevation at which it condensed. This tends to prolong the residence on the evaporating surface 19 of the lighter components of the liquid, so that there is a maximum opportunity for vaporization and condensation, revaporization, and recondensation, to occur, which promote fractionation. The combined action of the condenser, that elevates the condensate on the evaporating surface, and of the wipers, that whip the liquid film down over the evaporating surface 19, provides a unique action and unrivalled fractionating performance.

While the still is designed primarily for high vacuum work, it is very effective for distillation at low pressures, at atmospheric pressure, and even at superatmospheric pressure.

In the modified embodiment of the invention shown in FIG. 6, the condenser plates 55 and the channels 60 are formed with the same dimensions as those shown in FIG. 2. Generally U-shaped members 80 are seated respectively, in each of the channels 60, with their bight portions engaged against the axially extending strips 57. The wipers 71' are formed of sufficiently reduced width to seat within the U-shaped members 80, respectively, and are free to move radially therein under the influence of centrifugal force upon rotation of the condenser. The three U-shaped members 80 are each formed with wings 81 that are reversely bent, in opposite directions, at each side of the U-shaped member. The wings 81 provide axially extending troughs at each side of each column of wiper elements.

In operation of this modified type of still, liquid condensate that forms on the condensing surfaces 55', at low speeds of rotation of the condenser, drops directly into the reservoir inside the cylindrical member 12. At high speeds of rotation, centrifugal force acts on the liquid condensate, and it flows over the condensing surfaces 55' into the troughs provided by the wings 81, and is collected therein and runs downwardly through the funnel 13 and into the reservoir inside the cylindrical member 12. Thus, when the U-shaped members are inserted in the channels 60 behind the wipers, the still can be used only as a molecular still. However, when the U-shaped members 80 are removed, and the still is operated, the still can be either a molecular still or a fractionating still, depending upon the speed of rotation of the condenser.

Since the distillate that drops downwardly from the wings 81 is subjected to centrifugal force while in the wings, and therefore may have a tendency to fly radially outwardly, the top of the funnel 13 is disposed as closely adjacent the lower end of the rotor as practicable.

A fractionating still, that is constructed according to this invention, can be used to extremely good advantage in esterification reactions to eliminate traces of residual acid by distillation, thereby eliminating the processing and expense involved in the conventional alkali wash. Ordinary molecular distillation is not effective for this purpose, but fractional distillation, in a fractionating still constructed according to this invention, will remove residual acid from an ester with a high degree of efficiency.

A plant layout for conducting a simple esterification process, according to the present invention, is shown in FIG. 7. This layout includes an acid supply tank 110 and an alcohol supply tank 111. These supply tanks are connected to pumps 112 and 114, respectively, and through lines 115 and 116, respectively, with a reactor 117. The reactor 117 is provided with a jacket 120, within which heating fluid may be circulated to heat the reactants to a desired temperature. A top-mounted agitator 121 is provided for mixing the reactants. A carbon dioxide supply line 122 is connected to the bottom of the reactor tank 117 to permit carbon dioxide to be swept continuously through the reaction mixture.

The reactor 117 is vented through a line 124 to a chamber 125 that contains a water-cooled condenser 126. The chamber 125 preferably is connected through a line 127 to a pump, not shown, that will recirculate the sweep gas to the line 122 for reuse. To recover the condensate from the coil 126, a florentine bottle 130, or other decanting device, is mounted below the chamber 125 and is connected thereto through a line 131. The bottle 130 is provided with an overflow discharge line 132, and with a return line 134 that is connected through lines 135 and 136 with the upper portion and bottom of the reactor 117 respectively.

The reactor 117 is connected through a line 137 with a second reactor 140 that is similarly provided with a heating jacket 141 and a top-mounted agitator 142. The second reactor 140 is vented, in a manner similar to the first reactor 117, through a line 124' with a condenser chamber 125' that contains a condenser coil 126' to trap and condense vapors to return them to the reactor through a florentine bottle 130'.

The second reactor 140 is connected to a line 144 to discharge continuously to a vacuum still 145. This still is designed to strip excess alcohol from the reaction mixture, and to discharge the alcohol through a line 146, and to discharge the stripped reaction mixture through a line 147. The still 145 may be a molecular still, but preferably is a large size, high vacuum fractionating still, constructed according to this invention. The alcohol discharge line 146 is connected to a small still 148, that may be of the low vacuum, falling film type, that is designed to purify the alcohol so that it may be recycled. The impurities are discharged from the still 148 through a line 150, and the purified alcohol is delivered through a line 151 for recycling.

The line 147 is connected to deliver the stripped reaction mixture from the still 145 to a second high vacuum still 152. This still is a high vacuum, fractionating still constructed with troughs on its condensing surfaces, according to this invention. The purpose of this still is to distill from its liquid input any small amount of unreacted acid, and to discharge the unreacted fractionated acid through a line 154 for recycling. The residue from the still 152 is a substantially acid-free, alcohol-free ester, and it is discharged through the line 155 into another high vacuum fractionating still 168. In the still 168, the ester product is distilled to purify it, and the purified product is discharged through the line 169. A small residue fraction is discharged through a line 170.

Further to illustrate the invention, with reference to FIG. 7, the use of the general plant that is diagrammatically indicated therein will be described in connection with the production of an ester of phthalic anhydride and 2-ethyl hexyl alcohol, to demonstrate the techniques that are used for propagating esterification reactions of an essentially monofunctional condensation type.

Production of dioctyl phthalate

Since phthalic anhydride is a solid material, the layout illustrated in FIG. 7 is modified to provide for transfer of the solid phthalic anhydride from supply to the first reactor 117. Alternatively, a solvent can be employed to transfer the phthalic anhydride in solution from supply to the first reactor.

The phthalic anhydride and the 2-ethyl hexyl alcohol are transferred continuously from the acid supply and the alcohol storage tank 111, respectively, into the first reactor 117. The alcohol is fed into the reactor in sufficient amount to provide a stoichiometric excess of about 20%. The contents of the reactor are agitated continuously and are heated to a temperature of about 180° C. Carbon dioxide is continuously blown through the reactor to remove water, to accelerate the rate of reaction. The carbon dioxide sweep through the reactor removes a vapor mixture of alcohol and water. The vapor is condensed continuously, and settled to recover the alcohol, which is returned directly to the reactor, preferably below the level of the reactants. Where a solvent for phthalic anhydride is employed, it may be recovered in the same way, for reuse.

The contents of the reactor 117 are continuously withdrawn, at a rate sufficient to provide an average residence time in the reactor of approximately one hour. The reaction mixture is fed into the second reactor 140, in which it is heated to a temperature in the range of 180° C. to 200° C., while it is continuously agitated. Carbon dioxide is swept continuously through this reactor, and as before, a mixture of alcohol and water is swept away and is continuously condensed, and the condensate is decanted to recover alcohol, which may be returned directly to one of the reactors. In a second reactor, an equilibrium mixture is formed that is continuously withdrawn through the line 144 at a rate that is sufficient to give a residence time in the second reactor of approximately one hour.

Preferably, both reactors are maintained at atmospheric or at slightly subatmospheric pressure. The gas that is used to sweep the water from the stills can be any inexpensive, readily available inert gas. Ordinarily, carbon dioxide is preferred since it has a mild catalytic action. While operation at atmospheric pressure is preferred, to simplify the equipment that is required for making esters with alcohols of high vapor pressure, the reactors can be maintained under pressure.

The equilibrium mixture from the second reactor 140 is fed continuously into the still 145. This still is operated at a pressure of about 20 mm. to 30 mm. and at about 220° C., to remove excess alcohol from the equilibrium mixture. The still temperatures mentioned herein are, as in the present instance, the temperatures of the residues at the still bottoms, respectively, since temperatures measurements of the films on the still walls are quite difficult to make. Ordinarily, operation of a vacuum still is most readily controlled by observation of the relative proportions of the distillate and distilland. Pressures on the order of up to about 30 mm. permit the alcohol distillate to be condensed with an ordinary water-cooled condenser.

The alcohol distillate from the still 145 preferably is distilled in a small still 148 to remove a fraction of about 5% by weight of the distillate, which is discharged through the line 150, to purify the alcohol. The purified alcohol is than recycled. The recycled alcohol may be held in the storage tank, or it may be returned directly to the alcohol supply tank, or to one or the other of the two or more reactors; I prefer to return it to the supply tank.

The stripped equilibrium mixture from the still 145 is transferred through the line 147 into the second still 152. The still 152 is operated at a temperature and pressure that are adjusted to take off only the desired cut. The pressure may be, for example, below about 10 microns, and the temperature may be about 200°–210° C. The temperature and pressure are adjusted so that the distillate fraction from the still consists of unreacted acid and partial ester. Because of the fractionating ability of the still, very little diester is removed in this still; generally, the amount of diester removed can be on the order of 1% by weight or less in terms of throughput. However, since solid phthalic acid is much more soluble in the diester than in the partial ester, sufficient diester may be taken over as distillate to issolve the solid needles of acid from the condensing surfaces of the still, to keep them clean. The distillate fraction is transferred through the line 154 to the acid recycle tank, or alternatively, to the acid supply tank, or to one or the other of the reactors. I prefer to return it to the second reactor.

In the first still 145, some water is removed along with the alcohol that is stripped off, and the removal of water permits the esterification to move further toward completion. Because of the extreme turbulence that is maintained in the liquid film on the still wall, the liquid mixture is thoroughly agitated and unreacted components are brought into intimate contact. Those unreacted components that do not react are distilled from the mixture substantially completely in the two stills 145, 152, and are carried over as distillate that is recycled. In the second still 152, residual acid is completely removed.

The residue from the still 152, that is withdrawn through the line 155, is practically pure diester. It is superior to many products that are now available. To obtain a higher purity product with superior color characteristics, however, at little additional expense, the diester is passed into a third fractionating still 168, where it is distilled at a temperature of about 220° C. and a pressure preferably below about 5 microns of mercury. Substantially all of the input to the still is taken off as distillate, with a residue on the order of about 1% by weight based on liquid input. The residue consists primarily of a mixture of diester and color bodies. The distillate is a diester of high purity, excellent color, and is characterized by freedom from odor, by mildness, and by blandness.

For commercial production, the stills employed preferably have cylindrical evaporating surfaces that are, respectively, about 36″ in diameter and that provide about 48 square feet, in each still, of heated evaporating surface. The condensers preferably are rotated at speeds on the order of about 72 r.p.m. in these stills. At condenser speeds below about 35 r.p.m., the film characteristics on the evaporating surface are not at the optimum, and the characteristics of the still approach those of molecular distillation rather than fractionation, because of the limited amount of distillate that is returned to the evaporating surface.

Catalysts can be used to accelerate the rate of esterification, but excellent yields and reaction rates are obtained even when no catalyst is employed. The color of the product is consistently under ten on the scale of the American Public Health Association, which is much superior to diesters that are produced according to conventional techniques.

The process of propagating the chemical reaction to produce a superior product, employing techniques according to this invention, can be employed for the production of a wide variety of products. The process has general applicability to the propagation of reversible chemical reactions that form equilibrium mixtures, since the fractionating still is highly efficient in the removal of unreacted components. The process is particularly suited for use in connection with condensation reactions. The term "condensation" is employed to identify any reaction that results in the formation of new bonds between molecules that are not bonded together before the reaction, and that results in the elimination or evolution of a simple molecule such as, for example, water, a lower alcohol, hydrogen chloride, and the like. Examples of simple condensation reactions are esterification, amide formation, ether formation, and anhydride formation. Examples of more complex condensation reactions are the formations, respectively, of linear condensation polymers, such as, for example, polyesters, polyamides, polyethers, and polyanhydrides. Polyesters can be produced by the condensation of hydroxy acids, by direct reaction of dibasic acids and dihydric alcohols, by alcoholysis, by acidolysis, and by other methods; and the other condensation polymers can also be produced in a diversity of ways.

The process is particularly useful in connection with those condensation reactions in which the reactants each contain two, and only two functional groups that are capable of participating in the condensation, so that cross-linking does not occur. The process is applicable to those polyfunctional condensation reactions where the reaction product is not cross-linked sufficiently to be rigid.

While the still structure that is preferred employs a cylindrical evaporating surface, for many purposes, conical, semi-spherical, and other shaped surfaces can be used, with the wiper assemblies mounted to conform to the respective surfaces.

While in most cases the fluids that are treated in the stills and by the process of this invention are liquids; or are heat-softened, flowable solids; slurries, that is, suspensions of solids in liquids, can be processed equally efficiently.

In FIG. 1, the wipers 71 are shown spaced from the evaporating surface 19, for clarity of illustration. In FIGS. 4 and 6 the wipers are shown proportioned to fill the channels in which they are seated when engaging the evaporating surface 19. However, after slight wear occurs, the wipers ordinarily will not engage the radially outer faces of the strips 57 (FIGS. 2 and 4) when they are thrown outwardly under centrifugal force to engage the evaporating surface 19, in operation of the device. Correspondingly, the wipers 71 in FIG. 6 ordinarily will not engage both the evaporating surface 19 and the bight of the U-shaped member 80, in operation of the still after slight wear of the wipers; and in some cases, it may be helpful and advantageous to secure the member 80 to the contiguous strip 57, to limit outward radial movement thereof.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. Apparatus for the distillation of liquid comprising a body having a chamber that is formed with an internal surface of revolution, means for supplying liquid to said surface to flow thereover in a film, means for heating the liquid in said film to vaporize at least a part thereof, a condenser mounted for rotary relative movement with respect to said surface of revolution about an axis that is disposed within said surface, means for rotating said condenser, said condenser being formed with a plurality of axially-extending condensing surfaces that are angularly spaced from each other about the axis of rotation of the condenser and that are each substantially axially coextensive with said condenser and that are each generated by the movement of a straight line, that lies in the same plane as the axis of rotation of said condenser, through a continuous path extending from a first location adjacent said surface of revolution to a second location that is also adjacent said surface of revolution but that is angularly spaced from said first location, and which path extends from said first location generally inwardly toward said axis of rotation and generally outwardly away from said axis of rotation to said second location, and a plurality of elongate trough means mounted on said condenser and disposed to extend from said condensing surfaces to receive and collect the condensate from said condensing surfaces and to direct the collected condensate therein axially relative to said surface of revolution.

2. Apparatus for the distillation of liquid comprising a body having a chamber that is formed with an internal cylindrical surface having an upright axis, means for supplying liquid to said surface to flow downwardly thereover in a film under the influence of gravity, means for heating the liquid in said film to vaporize at least a part thereof, a condenser mounted for rotary relative movement with respect to said cylindrical surface about an axis that is disposed within said surface, means for rotating said condenser, said condenser being formed with a plurality of axially-extending condensing surfaces that are angularly spaced from each other about the axis of rotation of the condenser and that are each substantially axially coextensive with said condenser and that are each generated by the movement of a straight line, that is parallel to the axis of rotation of said condenser, through a smooth and continuous path extending from a first location adjacent said cylindrical surface to a second location that is also adjacent said cylindrical surface but that is angularly spaced from said first location, and which path extends from said first location generally inwardly toward said axis of rotation and then generally outwardly away from said axis of rotation to said second location, and a plurality of elongate trough means mounted on said condenser and disposed to extend from said condensing surfaces to receive and collect condensate from said condensing surfaces and to direct the collected condensate therein axially relative to said cylindrical surface.

3. Apparatus in accordance with claim 2 wherein said condensing surfaces are generally concave in transverse section and are symmetrical about axially-extending lines that are substantially equally radially spaced respectively from the axis of rotation of said condenser and that are substantially equiangularly spaced from each other.

4. Apparatus for the distillation of liquid comprising a body having a chamber that is formed with an internal surface of revolution having an upright axis, means for supplying liquid to said surface to flow downwardly thereover in a film under the influence of gravity, means for heating the liquid in said film to vaporize at least a part thereof, a condenser mounted for rotary relative movement with respect to said surface of revolution about an axis that is disposed within said surface of revolution, means for rotating said condenser, said condenser being formed with a plurality of angularly spaced condensing surfaces that extend generally axially of said surface of revolution and that are substantially coextensive axially with said condenser, said condenser having substantially uniform transverse sections, each said condensing surface having an axially extending trailing edge, relative to the direction of rotation of the condenser, that is disposed in close proximity to said surface of revolution, and a plurality of separate, elongate trough means secured on each of said condensing surfaces in axially spaced relation to each other and extending generally transversely of said condensing surfaces respectively, each said trough means being disposed to receive and collect condensate from the superjacent portion of the condensing surface to which it is attached and being inclined upwardly from its radially inner portion to its radially outer end and having its radially outer end open.

5. Apparatus for the distillation of liquid comprising a body having a chamber that is formed with an internal surface of revolution having an upright axis, means for supplying liquid to said surface to flow downwardly thereover in a film under the influence of gravity, means for heating the liquid in said film to vaporize at least a part thereof, a condenser mounted for rotary relative movement with respect to said surface of revolution about an axis that is disposed within said surface, means for rotating said condenser, said condenser being formed with a plurality of axially-extending condensing surfaces that are angularly spaced from each other about the axis of rotation of the condenser and that are each substantially axially coextensive with said condenser and that are each generated by the movement of a straight line, that lies in the same plane as the axis of rotation of said condenser, through a continuous path extending from a first location adjacent said surface of revolution to a second location that is also adjacent said surface of revolution but that is angularly spaced from said first location, and which path extends from said first location generally inwardly toward said axis of rotation and then generally outwardly away from said axis of rotation to said second location, and a plurality of separate, elongate trough means secured on each of said condensing surface in axially spaced relation to each other and extending generally transversely of said condensing surfaces respectively, each said trough means being disposed to receive and collect condensate from the superjacent portion of the condensing surface to which it is attached and being inclined upwardly from its radially inner portion to its radially outer end and having its radially outer end open.

6. Apparatus in accordance with claim 5 in which said trough means are mounted on each condensing surface in two generally vertical columns on the two opposite portions of each surface respectively that extend from the radially innermost part of the condensing surface to its radially outermost portions, and in which each individual trough means extends on its respective surface portion outwardly from a location that is radially outwardly spaced from said innermost surface part.

7. Apparatus in accordance with claim 6 in which the respective corresponding trough means in the two columns on a condensing surface are staggered axially.

8. Apparatus for the distillation of liquid comprising a body having a chamber that is formed with an internal surface of revolution having an upright axis, means for supplying liquid to said surface to flow downwardly thereover in a film under the influence of gravity, means for heating the liquid in said film to vaporize at least a part thereof, a condenser mounted for rotary relative movement with respect to said surface of revolution about an axis that is disposed within said surface, means for rotating said condenser, said condenser being formed with a plurality of angularly spaced condensing surfaces that extend generally axially of said surface of revolution and that are substantially coextensive axially with said condenser, said condenser having substantially uniform transverse sections, each said condensing surface having its axially extending radially outermost edges disposed in close proximity to said surface of revolution, and an axially extending trough member mounted on said condenser at each edge of each of said condensing surfaces respectively, each said trough member being substantially axially coextensive with said condenser and each said trough member being disposed to receive and collect any condensate flowing radially outward over its condensing surface toward said surface of revolution and to direct collected condensate therein axially downward in said apparatus.

9. Apparatus for the distillation of liquid comprising a body having a chamber that is formed with an internal surface of revolution having an upright axis, means for supplying liquid to said surface to flow downwardly thereover in a film under the influence of gravity, means for heating the liquid in said film to vaporize at least a part thereof, a condenser mounted for rotary relative movement with respect to said surface of revolution about an axis that is disposed within said surface of revolution, means for rotating said condenser, said condenser being formed with a plurality of angularly spaced condensing surfaces that extend generally axially of said surface of revolution and that are substantially coextensive axially with said condenser, said condenser having substantially uniform transverse sections, each said condensing surface having an axially extending trailing edge, relative to the direction of rotation of the condenser, that is disposed in close proximity to said surface of revolution, and a plurality of separate, elongate trough means secured on each of said condensing surfaces in axially spaced relation to each other and extending generally transversely of said condensing surfaces respectively, each said trough means being disposed to receive and collect condensate from the superjacent portion of the condensing surface to which it is attached and being inclined upwardly from its radially inner portion to its radially outer end and having its radially outer end open, said condenser being formed intermediate the trailing edge of each condensing surface and the leading edge of the adjacent condensing surface with support and guide means, and a substantially rigid wiper element mounted on said condenser for radial movement supported and guided by said guide means at a constant orientation and through a radial path relative to said surface of revolution to engage said surface of revolution intermediate the trailing edge of each condensing surface and the leading edge of the adjacent condensing surface under centrifugal force upon rotation of said condenser, said element being formed with radially projecting lands and with recesses between said lands, said lands and said recesses having substantial angular extent relative to said surface of revolution and said element being mounted with said lands disposed to engage said surface of revolution over broad bearing areas of substantial angular extent under centrifugal force upon rotation of said condenser, said lands and said recesses being arranged to remove liquid from said surface at the leading edge of each of said lands upon rotation of said condenser and being arranged to direct the removed liquid into said recesses to be commingled therein and to return the removed liquid therefrom to said surface, again to flow downwardly thereover in a film under the influence of gravity.

10. Apparatus for the distillation of liquid comprising a body having a chamber that is formed with an internal surface of revolution having an upright axis, means for supplying liquid to said surface to flow downwardly thereover in a film under the influence of gravity, means for heating the liquid in said film to vaporize at least a part thereof, a condenser mounted for rotary relative movement with respect to said surface of revolution about an axis that is disposed within said surface of revolution, means for rotating said condenser, said condenser being formed with a plurality of angularly spaced condensing surfaces that extend generally axially of said surface of revolution and that are substantially coextensive axially with said condenser, said condenser having substantially uniform transverse sections, each said condensing surface having an axially extending trailing edge, relative to the direction of rotation of the condenser, that is disposed in close proximity to said surface of revolution, and a plurality of separate, elongate trough means secured on each of said condensing surfaces in axially spaced relation to each other and extending generally transversely of said condensing surfaces respectively, each said trough means being disposed to receive and collect condensate from the superjacent portion of the condensing surface to which it is attached and being inclined upwardly from its radially inner portion to its radially outer end and having its radially outer end open, said condenser being formed intermediate the trailing edge of each condensing surface and the leading edge of the adjacent condensing surface with support and guide means, and a vertically arranged series of substantially rigid wiper blades mounted on said condenser for movement supported and guided by said guide means at a constant orientation and through a radial path relative to said surface of revolution to engage said surface of revolution intermediate the trailing edge of each condensing surface and the leading edge of the adjacent condensing surface under centrifugal force upon rotation of said condenser, each of said blades being free to move radially independently of said other blades and having an axial length less than the axial length of said surface of revolution, each blade being formed with radially projecting lands and with recesses between said lands, said lands and said recesses having substantial angular extent relative to said surface of revolution and said blades being mounted with said lands disposed to engage said surface of revolution over broad bearing areas of substantial angular extent under centrifugal force upon rotation of said condenser, said lands and said recesses being arranged to remove liquid from said surface at the leading edge of each of said lands upon rotation of said condenser and being arranged to direct the removed liquid into said recesses to be commingled therein and to return the removed liquid therefrom to said surface, again to flow downwardly thereover in a film under the influence of gravity.

11. Apparatus for the fractional distillation of liquid in thin film form comprising a body having a chamber that includes a fractionating zone and a product recovery zone, said fractionating zone including at least a part of said chamber that is formed with an internal surface of revolution having an upright axis, means for supplying liquid to said surface to flow downwardly thereover in a film under the influence of gravity, means for heating the liquid in said film to vaporize at least a part thereof, a first condenser that is mounted within said fractionating zone for condensing partially the vapor therein and for rotary relative movement with respect to said surface of revolution about an axis that is generally coaxial with the axis of said surface, means for rotating said first condenser, said first condenser being formed with a plurality of axially-extending condensing surfaces that are substantially coextensive axially with said first condenser, said condenser having substantially uniform transverse sections, each said condensing surface having an axially-extending trailing edge, relative to the direction of rotation of said first condenser, that is disposed in close proximity to said surface of revolution, and a plurality of separate, elongate trough means secured on each of said condensing surfaces of said first condenser in axially spaced relation to each other and extending generally transversely of said condensing surfaces respectively, each said trough means being disposed to receive and collect condensate flowing downwardly from the superjacent portion of the condensing surface to which it is attached, and being inclined upwardly from its radially inner portion to its radially outer end and having its radially outer end open and disposed adjacent said surface of revolution, said first condenser being formed intermediate the trailing edge of each condensing surface and the leading edge of the adjacent condensing surface with support and guide means, and a vertically arranged series of substantially rigid wiper blades mounted on said condenser in superposed relation relative to each other and for movement supported and guided by said guide means at a constant orientation and through a radial path relative to said surface of revolution to engage said surface of revolution intermediate the trailing edge of each condensing surface and the leading edge of the adjacent condensng surface under centrifugal force upon rotation of said condenser, each of said blades being free to move radially independently of said other blades and having an axial length less than the axial length of said surface of revolution, each blade being formed with radially projecting lands and with recesses between said lands, said lands and said recesses having substantial angular extent relative to said surface of revolution and said blades being mounted so that said lands engage said surface of revolution over broad bearing areas of substantial angular extent under centrifugal force upon rotation of said condenser, said lands and said recesses being arranged to remove liquid from said surface at the leading edge of each of said lands upon rotation of said condenser and being arranged to direct the removed liquid into said recesses to be commingled therein and to return the removed liquid therefrom to said surface, again to flow downwardly thereover in a film under the influence of gravity, a second condenser disposed in said recovery zone and spaced from said first condenser for condensing vapor from said fractionating zone, and means for recovering the condensate that is condensed on said second condenser.

12. A method for the fractional distillation of liquid comprising applying said liquid to at least a part of an internal surface of revolution having an upright axis to flow downwardly thereover in a liquid distilland film under the influence of gravity, heating the liquid in said film to vaporize at least a part thereof, partially condensing the vapor, returning the condensate to said surface at a plurality of angularly spaced, axially aligned locations and above the level at which condensation of the condensate occurred, for reheating thereof, substantially immediately removing from said surface at least a substantial portion of the returned condensate together with the distilland film, collecting the removed liquid in a plurality of axially spaced streams and commingling the removed liquid therein, and then returning the commingled liquid to said surface again to form a distilland film to flow downwardly over said surface under the influence of gravity.

13. A method for the fractional distillation of a liquid comprising applying said liquid to at least a part of an internal surface of revolution having an upright axis to flow downwardly thereover in a liquid distilland film under the influence of gravity, heating the liquid in said film to vaporize at least a part thereof and to cause the vapor to travel from said film with a component in an upward direction relative to said surface of revolution to travel in a generally upward path, partially condensing said vapor, returning the condensate to said surface at a plurality of angularly spaced, axially aligned locations and above the level at which condensation of said condensate occurred, for reheating and revaporizing of at least a part thereof, substantially immediately removing from said surface at least a substantial portion of the returned condensate together with the ditsilland film, collecting the removed liquid in a plurality of axially spaced streams and commingling the removed liquid therein, then returning at least a substantial portion of the commingled liquid to said surface at an axially displaced portion thereof from the portion of said surface from which it was removed, again to form a distilland film to flow downwardly over said surface under the influence of gravity, condensing the vapor in an upper zone, and recovering the condensate in said upper zone as a product fraction.

14. A method for the fractional distillation of liquid comprising applying said liquid to at least a part of an internal surface of revolution having an upright axis to flow downwardly thereover in a film under the influence of gravity, heating the liquid in said film to vaporize at least a part thereof and to cause the vapor to travel from said film with a component in an upper direction relative to said surface of revolution to travel in a generally upward path between said surface of revolution and a plurality of angularly spaced, axially-extending condensing surfaces that have axially extending continuous radial extremities that are disposed closely adjacent said surface of revolution, partially condensing the evolved vapor on said condensing surfaces, rotating said condensing surfaces as a unit about an axis that is generally coaxial with the axis of said surface of revolution to cause said condensing surface to move relative to said surface of revolution, thereby subjecting the condensate on each said condensing surface to centrifugal force that has a tendency to impel the condensate to flow over said condensing surface to return to said surface of revolution, diverting the flowing condensate upwardly on each said condensing surface to cause it to return to said surface of revolution at a plurality of angularly spaced, axially aligned locations on said surface of revolution above the level at which condensation of said condensate occurred, for reheating and revaporizing of at least a part thereof, substantially immediately removing from said surface at least a substantial portion of the return condensate together with the distilland film, collecting the removed liquid in a plurality of axially spaced streams and commingling the removed liquid therein, then returning at least a portion of the commingled liquid to said surface again to form a distilland film to flow downwardly over said surface under the influence of gravity, condensing the vapor in an upper zone above said condensing surface, and recovering the condensate in said upper zone.

15. In a process for propagating a chemical reaction in a fluid reaction mass containing at least one relatively volatile reaction product that must be removed to drive the reaction to a desired degree of completion, the improved method for removing said relatively volatile reaction product from said mass under vacuum comprising applying said mass to at least a part of a heated, internal surface of revolution having an upright axis in an evacuated chamber, to flow downwardly over said surface in a liquid distilland film under the influence of gravity and at a temperature and at a reduced pressure at which at least a portion of said relatively volatile product will leave said film as a vapor, passing said vapor along a generally upright path between said surface and a cooled condenser having a plurality of angularly spaced condensing surfaces, partially condensing said vapor on said condensing surfaces to form a liquid condensate, returning said condensate to said surface of revolution at a plurality of angularly spaced, axially aligned locations, substantially immediately removing from said surface at least a substantial portion of the returned condensate together with the distilland film, collecting the removed liquid in a plurality of axially spaced streams and commingling the removed liquid therein, and then returning at least a portion of the commingled liquid to said surface of revolution again to form a distilland film to flow downwardly over said surface of revolution under the influence of gravity.

16. A process for propagating a chemical reaction in a fluid reaction mass containing at least one relatively volatile reaction product that must be removed to drive the reaction to a desired degree of completion, the improved method for removing said relatively volatile reaction product from said mass under vacuum comprising applying said mass to at least a part of a heated, internal surface of revolution having an upright axis in an evacuated chamber, to flow downwardly over said surface in a liquid distilland film under the influence of gravity and at a temperature and at a reduced pressure at which at least a portion of said relatively volatile reaction product will leave said film as vapor, passing said vapor along a generally upright path between said surface and a cooled rotary condenser having a plurality of angularly spaced condensing surfaces, partially condensing said vapor on said condensing surfaces to form a liquid condensate, rotating said condenser to subject said condensate to centrifugal force, returning said condensate under said centrifugal force to said surface of revolution by liquid flow over said condensing surfaces and at a plurality of angularly spaced, axially aligned locations and at a location axially of said surface above the level at which condensation of said condensate occurred, substantially immediately removing from said surface of revolution at least a substantial portion of the returned condensate together with the distilland film, collecting the removed liquid in a plurality of axially spaced streams and commingling the removed liquid therein, then returning at least a portion of the commingled liquid to said surface at an axially displaced portion of said surface of revolution from the portion thereof from which it was removed, again to form a film to flow downwardly over said surface of revolution under the influence of gravity, and withdrawing from the upper end of said path any uncondensed vapor.

References Cited in the file of this patent

UNITED STATES PATENTS

| | | |
|---|---|---|
| 2,306,265 | Heald | Dec. 22, 1942 |
| 2,493,220 | Bibby | Jan. 3, 1950 |
| 2,562,153 | Taylor | July 24, 1957 |
| 2,890,155 | Beuche | June 9, 1959 |

FOREIGN PATENTS

| | | |
|---|---|---|
| 330,805 | Great Britain | June 9, 1930 |